United States Patent Office 2,876,213
Patented Mar. 3, 1959

2,876,213

MULTIFUNCTIONAL LUBRICANT ADDITIVES

Jeffrey H. Bartlett, Westfield, and William C. Hollyday, Jr., Fanwood, N. J., assignors to Esso Research and Engineering Company, a corporation of Delaware No Drawing. Application July 28, 1954
Serial No. 446,413

11 Claims. (Cl. 260—78.5)

This invention relates to additives for lubricating oil and to the compositions containing them. Particularly the invention relates to lubricating oil additives possessing the desirable characteristics of improving both the ASTM pour points and the viscosity indices of lubricating oils with which they are blended. More particularly the invention relates to polymers and copolymers of alpha-beta ethylenically unsaturated carboxylic and polycarboxylic acid esters wherein the ester groups are derived from primary aliphatic branched chain alcohols which contain one alkyl group of at least 8 carbon atoms on the carbon atom adjacent to the carbinol group.

The art of lubricating oil additive manufacture has long been familiar with the preparation of polymers and copolymers to form materials useful for improving desirable characteristics of lubricating oils. Of particular interest in recent years has been the development of additive materials for improving the rate of change of viscosity of an oil with a change in temperature, and for lowering the temperature at which the lubricating oil loses its property of free flow. Such materials as polymers and copolymers of acrylate and methacrylate esters, polymers and copolymers of alpha-beta unsaturated polycarboxylic acid esters, etc., have been found to be very satisfactory for many purposes.

The instant invention relates to such materials wherein the ester groups are of a particular structure.

It is known that saturated straight chain primary alcohols having 11 to 16 carbon atoms may be esterified with α-β unsaturated acids and then polymerized to yield pour depressants. Polymeric esters of straight chain primary alcohols having more than 16 carbon atoms have some activity, but are of insufficient potency to be effective as pour depressants. However, we have now found that primary alcohols having more than 16 carbon atoms may be used in the preparation of polymeric ester pour depressants when they possess an alkyl group on the α carbon to the carbinol group. We have also found that such alcohols should preferably possess an alkyl group on the α carbon with an effective straight chain of 8 or more carbon atoms, preferably 10 to 16 carbon atoms.

These primary branched chain alcohols may be prepared by any method. Two methods which are suitable are (1) by aldolization of aldehydes, dehydrating the aldol product, and then hydrogenating the olefinic aldehyde to the primary alcohol or (2) by the dimerization of alcohols in the Guerbet reaction. The formation of these alcohols are set out in detail below.

(1) *Aldol condensation of aldehydes.*—At a temperature of about 30° to 200° F. in the presence of an alkaline catalyst, such as sodium alcoholate, sodium carbonate, sodium hydroxide and the like, aldehydes possessing a methylene group adjacent to the carbonyl group readily condense to an aldol which is a beta-hydroxy aldehyde. This material is readily dehydrated to the unsaturated aldehyde having twice as many carbon atoms as the starting material. The reaction takes place in accordance with the following:

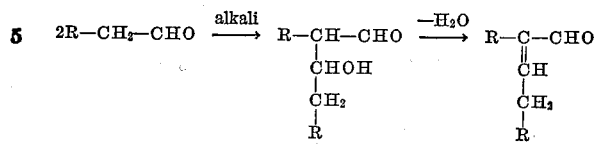

It is preferred that the molecular ratio of catalyst to aldehyde in this reaction be about 1 to 20, more preferably from 1 to about 10. The dehydration step is easily accomplished by heating the mixture alone, or in the presence of a trace of mineral acid. The unsaturated aldehyde may then be hydrogenated to the branched chain alcohol

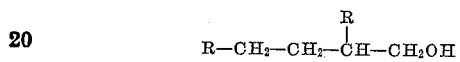

(2) *Condensation of alcohols.*—When primary or secondary alcohols are contacted with an alkaline catalyst such as sodium alcoholate, sodium borate, sodium alkyl borate, sodium hydroxide, metallic sodium and the like, the methylene group adjacent to the carbinol (hydroxylated carbon) group enters into a condensation reaction with another molecule of alcohol. This reaction takes place under the following conditions:

Alcohol/caustic mol ratio _____ 1:1 to 20:1.
Temperature _____ 350° to 500° F.
Time _____ 5 to 20 hours.

When relatively low concentrations of catalyst are used, e. g., 10 to 20 mols of alcohol per mol of sodium alcoholate, water is eliminated in accordance with the following equation:

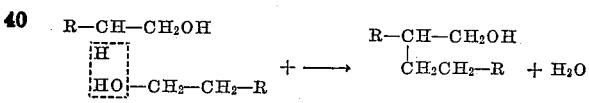

The yield of the alcohol is increased by use of minor amounts, from 1 to 5 grams per mol of alcohol, of a dehydrogenation catalyst, such as copper, zinc, nickel, ferric salts, and the like. Catalysis is not essential, however.

When a single aldehyde is used in Reaction 1 or a single alcohol is used in Reaction 2, the product alcohols are dialkyl ethanols in which the alkyl groups differ by two carbon atoms. Thus, decanal or decanol gives 2-octyl 2-decyl ethanol; dodecanal or dodecanol gives 2-decyl 2-dodecyl ethanol; tetradecanal or tetradecanol gives 2-dodecyl 2-tetradecyl ethanol; etc. When mixed aldehydes or mixed alcohols are employed in Reactions 1 or 2, the products contain alcohols like those illustrated above and also alcohols derived by co-condensation of the mixed reactants. Thus, a mixture of dodecanol and tetradecanol gives 2-decyl 2-dodecyl ethanol, 2-dodecyl 2-tetradecyl ethanol and also 2,2-didodecyl ethanol and 2-decyl 2-tetradecyl ethanol. A still greater number of species may be obtained by using a wider mixture of alcohols such as $C_{10}$ to $C_{18}$ alcohols derived from coconut and similar oils. In some cases these mixed products are preferred.

While the preparation of the branched alcohols suitable for use in this invention by aldolization and by Guerbet condensation have been described in some detail, the alcohols can also be made by other known reactions such as by subjecting olefins to the Oxo reaction with CO and $H_2$, or to reaction with formaldehyde, The primary branched chain aliphatic alcohols prepared as above preferably contain from 20 to 36 carbon atoms with a branched chain containing at least 8 carbon atoms, preferably from 10 to 16 carbon atoms. Not all of the alcohols used need be branched. Only a substantial portion of branching need be present for optimum result.

These alcohols are used to prepare esters of unsaturated carboxylic acids by known procedures. Operable acids include fumaric acid, maleic acid or anhydride, citraconic acid, mesaconic acid, itaconic acid, aconitic acid, acrylic acid, methacrylic acid and the like. Preferred are the esters of fumaric, maleic, acrylic and methacrylic acid, with fumaric and methacrylic acid being especially preferred.

Although polymers of the above mentioned acid esters form desirable additives, very useful copolymers may be formed by copolymerizing with the acid esters as described above from about 2.0% to about 40.0% of other polymerizable monomeric materials. These materials may be represented by the following formula:

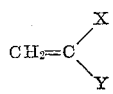

wherein:

(1) X is hydrogen and Y is an ester group

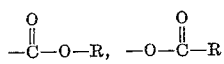

(R being an alkyl group containing from 2 to 18 carbon atoms such as methyl, ethyl, butyl, lauryl, stearyl and the like), i. e., vinyl acetate, vinyl butyrate, vinyl laurate, vinyl stearate, methyl acrylate, lauryl acrylate, stearyl acrylate and the like.

(2) X is methyl and Y is as described above, i. e. isopropenyl acetate, isopropenyl laurate, methyl methacrylate, lauryl methacrylate, etc.

(3) X is a halogen and Y is as described above, i. e., alphachlorovinyl acetate, alpha-chlorovinyl laurate, etc.

(4) X is hydrogen or methyl and Y is an aromatic group, i. e., styrene, alpha-methyl styrene, and the like.

(5) X is hydrogen or methyl and Y is —C≡N, i. e. acrylonitrile, or

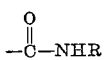

such as in acrylamide derivatives.

Although any of the polymerizable monomeric materials typified by the formula above are operable to form useful copolymers with the acid esters outlined above, the preferred embodiment contemplates the use of vinyl fatty acid esters containing from 3 to 18 carbon atoms and their substitution products. Vinyl acetate is particularly desirable.

Particularly desirable tripolymers are made by copolymerization of a di-alkyl fumarate or maleate ester wherein the ester groups are of the branched chain configuration as described above with a $C_2$–$C_4$ straight chain alcohol di-ester of fumaric or maleic acid and with a vinyl ester as described above. For instance, a tripolymer of from 49 to 71 wt. percent of a $C_{24}$ to $C_{32}$ branched chain di-ester of fumaric acid with from 11 to 26 wt. percent of di-ethyl fumarate and from 5 to 30 wt. percent of vinyl acetate gives excellent pour depressing characteristics.

Depending upon the desired product, the monomers in the copolymerization reaction may be varied greatly. However, when a copolymer of a carboxylic acid ester and a vinyl ester is being prepared, it is desirable that from 2% to 40% of vinyl acetate, preferably 10% to 25%, be used with the polycarboxylic acid. A copolymer of 80% polycarboxylic acid ester with 20% vinyl acetate has outstanding pour depressant qualities.

The process may be applied to any of the well known polymerization techniques. For instance, the bulk-polymerization technique, wherein the catalyst used is added directly to the mixture of the monomers, may be used applying the process of invention. If it is desired, the solution polymerization technique may be utilized, that is, the technique of polymerization in which the monomers are dissolved in an inert solvent, ranging from heavy motor oil fractions to petroleum hydrocarbons, including chlorinated petroleum cuts, etc., and the catalyst added. When the solution polymerization technique is used, it is preferred that the monomer concentration in the diluent range from 20% to 99% by weight, based on the weight of the total mixture. The suspension technique of polymerization or the emulsion polymerization technique wherein an emulsifying agent such as soap is used to form an emulsion with the monomers and water and a water soluble catalyst is utilized may also be adapted to the process of invention with excellent results.

The reaction conditions to be experienced may also be varied within wide ranges. In the preferred embodiment, the copolymerization of dibasic acid esters with other polymerizable materials, it is preferred that temperatures within a range of from room temperature to 250° F. be used, preferably the equilibrium temperature of the reaction, or that temperature at which the reaction proceeds most smoothly within a characteristic temperature rise, normally between 100° to 200° F. In most instances it will be found advantageous to utilize from .05% to 3% by weight, based on the weight of the monomers, of a peroxide catalyst, with .2% to 2.0% by weight being preferred. Among the operable catalysts are hydrogen peroxide, benzoyl peroxide, cumene hydroperoxide, potassium persulfate, lauroyl peroxide, ammonium persulfate, urea hydroperoxide, tert.-butyl hydroperoxide, tert.-butyl perbenzoate, and the like, benzoyl peroxide being used in the preferred embodiment.

The ethylenically unsaturated carboxylic acid esters of this invention, whether polymers or copolymers with other polymerizable materials, may be blended with lubricating oils in varying proportions. For pour depressing purposes from about 0.005% to about 10.0% by weight, preferably 0.01% to about 2.0% by weight, has been found to be operable in most base stocks. Amounts varying between about 0.5% and 20.0% by weight have been found to give desirable viscosity index improvement. Lubricating oil concentrates of the materials containing up to about 80% by weight of the product are useful for shipping and handling purposes. These concentrates are then diluted with the desired base stock to obtain a finished formulation containing a pour depressing or a viscosity index improving amount of the additive. Percentages given are by weight, based on the weight of the total composition.

The invention will be more clearly explained by reference to the following illustrative examples.

EXAMPLE I a. Preparation of branched chain $C_{28}$ alcohol

A 1-gallon nickel reactor equipped with a stirrer, thermometer and water trap with a condenser was charged with 2354 g. n-tetradecanol (11 mols)
88 g. 50% NaOH (1.1 mols)
11 g. Cu powder
160 cc. toluene The above mixture was heated to 223° C. during 3 hours to form the sodium alcoholate, then the heating was continued at 230° to 250° C. for 16 hours. A total of 127 cc. of water was collected including the water from the alcoholate formation. The hot reaction mixture was removed from the reactor by suction and poured into 5 liters of water to which 700 cc. of isopropyl alcohol had been added. This mixture was then extracted with petroleum ether which was evaporated leaving 1862 g. of crude alcohols. These alcohols were distilled on the short path still and a $C_{28}$ alcohol fraction of 1460 g. was obtained at 0.15 mm. with a boiling point of 195° to 205° C. and had a hydroxyl number of 0.235 centiequivalent per gm. This alcohol is 2-dodecyl hexadecanol.

b. Preparation of di-$C_{28}$ fumarate

Charge:
 102.2 g. (0.24 mol) $C_{28}$ alcohol (2-dodecyl hexadecanol)
 14.0 g. (0.12 mol) furamic acid
 3.0 g. toluene sulfonic acid, tech.
 100 ml. toluene This mixture was refluxed with provision for separating the water which distilled over with the toluene. After 15 hours' refluxing (bottoms temperature 125 to 140° C.) a total of 4.2 ml. of water had been collected (96.5% of the theoretical 4.35 ml.).

The final product was thoroughly washed with water and 5% NaOH solutions, then dried over anhydrous sodium sulfate. After removal of the solvent on the steam bath (with nitrogen flushing) there were obtained 109 g. of the fumarate ester.

c. Preparation of di-$C_{28}$ fumarate-vinyl acetate copolymer

Charge:
 44 g. di-$C_{28}$ fumarate
 6 g. vinyl acetate, distilled

*Copolymerization.*—The catalyst, benzoyl peroxide, was added in 0.2% increments while the temperature was held at 65 to 70° C. The total reaction time was 30 hours and a total of 1.4% catalyst was added, spaced rather evenly over the reaction time.

To the final product were added 75 g. of a white oil (42 SUS/210° F.) to give a 40% blend of copolymer in oil.

POUR DEPRESSANCY OF DI-$C_{28}$ FUMARATE-VINYL ACETATE COPOLYMER

| Wt. percent Copolymer | ASTM Pour Point, °F., in lubricating oils | |
|---|---|---|
|  | Oil A [1] | Oil B [2] |
| 0:00 | +10 | +15 |
| 0.01 | +5 | +15 |
| 0.02 | −5 | +15 |
| 0.03 | −30 | +15 |
| 0.05 | <−35 | 0 |
| 0.10 | <−35 | −20 |
| 0.20 | <−35 | −30 |

[1] Oil A—phenol extracted Mid-Continent distillate having a viscosity at 210° F. of 45.6 SUS and a V. I. of 100.
[2] Oil B—phenol extracted Mid-Continent distillate having a viscosity at 210° F. of 56.0 SUS and a V. I. of 100.

EXAMPLE II

*Preperation of di-$C_{28}$ fumarate-ethyl fumarate-vinyl acetate copolymer*

Charge:
 63.0 g. di-$C_{28}$ fumarate
 27.2 g. ethyl fumarate
 27.0 g. vinyl acetate, distilled The catalyst, benzoyl peroxide, was added in 0.1% increments approximately every hour, while the temperature was maintained at 65 to 75° C. A total of 0.9% catalyst was added and the reaction was continued for a total time of 18 hours. A white oil of 42 SUS at 210° F. was added to give a final blend containing 65% copolymer. This copolymer was tested as a viscosity index (V. I.) improver and pour depressant for lubricating oils.

V. I. IMPROVEMENT BY DI-$C_{28}$ FUMARATE-ETHYL FUMARATE-VINYL ACETATE COPOLYMER

| Wt. Percent Copolymer | Viscosity Characteristics of Blends in Oil C [1] | | |
|---|---|---|---|
|  | SUS/100° F. | SUS/210° F. | V. I. |
| 0.0 | 174.0 | 45.7 | 113.0 |
| 3.6 | 304.1 | 62.2 | 140.0 |
| 5.0 | 399.0 | 74.9 | 142.5 |
| 10.0 | 973.0 | 153.0 | 137.8 |

[1] Blend of extracted Mid-Continent stocks: 95% distillate and 5% bright stock.

POUR DEPRESSANCY OF DI-$C_{28}$ FUMARATE-ETHYL FUMARATE-VINYL ACETATE COPOLYMER

| Wt. Percent Copolymer | ASTM Pour Point, °F., in Lubricating Oils | |
|---|---|---|
|  | Oil A | Oil B |
| 0.00 | +10 | +15 |
| 0.01 | +10 | +15 |
| 0.05 | −10 | +15 |
| 0.20 | <−35 | −30 |

EXAMPLE III a. Preparation of $C_{28}$ methacrylate

Charge:
 102.2 g. (0.24 mol) $C_{28}$ alcohol (2-dodecyl hexadecanol)
 106.0 g. (1.06 mols) methyl methacrylate
 3.0 g. toluene sulfonic acid hydrate
 1.0 g. hydroquinone The mixture was distilled slowly while the overhead was taken through a 6-bulb Snyder column. After 3 hours' distillation there were removed 52.5 g. of methanol-methyl methacrylate mixture (refractive index 1.4018 at 20° C., containing 13.7% methanol). The methanol obtained was therefore 7.19 g. (or 92% of the theoretical 7.70 g).

The reaction mixture was diluted with hexane and thoroughly washed with water and 5% sodium hydroxide solutions. The curd which separated (methyl methacrylate polymer) was removed by filtration. The hexane solution was dried over anhydrous sodium sulfate, then the solvent (hexane and excess methyl methacrylate) was removed on the steam bath with nitrogen flushing. The yield of $C_{28}$ methacrylate was 110.5 g.

b. Polymerization of $C_{28}$ methacrylate

Charge:
 22.0 g. $C_{28}$ methacrylate
 5.5 g. white oil (42 SUS/210° F.)
 0.25 g. benzoyl peroxide The mixture was heated at about 80° C. until it became quite viscous. The product was tested as a pour depressant. Data are set out below:

POUR DEPRESSANCY OF $C_{28}$ METHACRYLATE POLYMER

| Wt. Percent Copolymer | ASTM Pour Point, °F. | |
|---|---|---|
|  | Oil A | Oil B |
| 0.00 | +10 | +15 |
| 0.01 | −10 | +5 |
| 0.02 | −30 | −15 |
| 0.03 | <−35 | −20 |
| 0.05 | <−35 | −20 |
| 0.10 | <−35 | −25 |
| 0.20 | <−35 | −30 |

EXAMPLE IV a. Preparation of di-$C_{24}$ fumarate

Charge:
- 118.0 g. (0.334 mol) $C_{24}$ alcohol (2-decyl tetradecanol)
- 19.5 g. (0.168 mol) fumaric acid
- 1.5 g. toluene sulfonic acid, tech.
- 150 ml. benzene The mixture was refluxed for 8 hours (bottoms temperature about 100° C.) during which time only 1 ml. of water was evolved. Most of the benzene was removed by distillation and 50 ml. of toluene were added. This raised the bottoms temperature to about 130° C. After a total of 70 hours' reflux there were collected 5.4 ml. of water (90% of theoretical 6.0 ml.). There were recovered 2.4 g. of unreacted fumaric acid.

The reaction mixture was diluted with hexane and thoroughly washed with water and 5% NaOH solutions, then dried over anhydrous sodium sulfate. The solvent was removed on the steam bath with nitrogen blowing.

b. Preparation of di-$C_{24}$ fumarate polymer

Charge:
- 10.8 g. di-$C_{24}$ fumarate
- 0.25 g. benzoyl peroxide

The mixture was heated at 80° C. for one hour to dissolve the benzoyl peroxide. Heating was continued at 50° C. for 15 hours, followed by heating at 90° C. for 5 hours. The product was tested as a pour depressant.

POUR DEPRESSANCY OF DI-$C_{24}$ FUMARATE POLYMER

| Wt. Percent Polymer | ASTM Pour Point, °F., in Lubricating Oils | |
|---|---|---|
| | Oil A | Oil B |
| 0.00 | +10 | +15 |
| 0.01 | +10 | +15 |
| 0.05 | +5 | +15 |
| 0.20 | −5 | +5 | c. Preparation of di-$C_{24}$ fumarate-vinyl acetate copolymer

Charge:
- 26.0 g. di-$C_{24}$ fumarate
- 6.5 g. vinyl acetate, distilled
- 0.3 g. benzoyl peroxide This reaction was heated at 100° C. for about 45 minutes (with agitation) when a sudden copolymerization set in. The final product was a very viscous copolymer, completely and readily soluble in mineral oils.

POUR DEPRESSANCY OF DI-$C_{24}$ FUMARATE-VINYL ACETATE COPOLYMER

| Wt. Percent Copolymer | ASTM Pour Point, °F. | |
|---|---|---|
| | Oil A | Oil B |
| 0.00 | +10 | +15 |
| 0.01 | +5 | +15 |
| 0.05 | +5 | +15 |
| 0.20 | +5 | +15 |

EXAMPLE V a. Preparation of di-$C_{32}$ fumarate-vinyl acetate copolymer

Charge:
- 10.1 g. di-$C_{32}$ fumarate
- 3.0 g. vinyl acetate, distilled
- 0.2 g. benzoyl peroxide The $C_{32}$ alcohol (2-tetradecyl octodecanol) had been prepared from n-hexadecanol, and the di-$C_{32}$ fumarate had been prepared by the methods previously described. The copolymerization was carried out by heating the charge at about 55° C. for 15 hours. The viscous product was blended with a white oil to give a 50% copolymer blend, and this material was tested as a pour depressant.

POUR DEPRESSANCY OF DI-$C_{32}$ FUMARATE-VINYL ACETATE COPOLYMER

| Wt. Percent Polymer | ASTM Pour Point, °F., in Lubricating Oils | |
|---|---|---|
| | Oil A | Oil B |
| 0.00 | +10 | +15 |
| 0.01 | 0 | +10 |
| 0.05 | 0 | −5 |
| 0.20 | −5 | −15 |

EXAMPLE VI a. Preparation of di-$C_{32}$ fumarate-ethyl fumarate-vinyl acetate copolymer Charge:
- 17.0 g. di-$C_{32}$ fumarate
- 3.0 g. vinyl acetate, distilled
- 20.0 g. ethyl fumarate The di-$C_{32}$ fumarate and vinyl acetate were heated at 70° C. for 20 hours. During this time five portions of benzoyl peroxide totaling 0.25 g. were added. At the end of this time the ethyl fumarate and 0.1 g. of benzoyl peroxide were added and the reaction was continued at 90° C. for 3 hours. The final product was thoroughly extracted with cold isopropyl alcohol to remove unreacted monomers and 27.5 g. of copolymer were obtained. This copolymer was tested as a pour depressant.

POUR DEPRESSANCY OF DI-$C_{32}$ FUMARATE-ETHYL FUMARATE-VINYL ACETATE COPOLYMER

| Wt. Percent Polymer | ASTM Pour Point, °F., in Lubricating Oils | |
|---|---|---|
| | Oil A | Oil B |
| 0.00 | +10 | +15 |
| 0.01 | +5 | +15 |
| 0.05 | +5 | +5 |
| 0.20 | +5 | +5 |

To summarize, the instant invention relates to new compositions of matter that have utility for depressing the pour point and increasing the viscosity index of lubricating oils with which they are blended. The materials of the invention are added to lubricating oils in proportions of from about 0.005% to about 20.0% by weight, based on the weight of the total composition.

The new compositions of matter are polymers of alpha, beta-unsaturated carboxylic esters, and copolymers of such esters with other polymerizable materials. The gist of the instant invention lies in the structure of the ester groups. They are derived from branched chain primary alcohols having from 20 to 36 carbon atoms in the molecule, and having one branch which consists of a normal alkyl group containing at least 8 carbon atoms and preferably from 10 to 16 carbon atoms, the branch being attached to the carbon atom adjacent to the carbinol group.

The alpha, beta-unsaturated carboxylic acid esters contemplated in preparing materials of this invention may be described by the following formula:

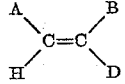

In the formula A and D are selected from the group of hydrogen atoms and —COOR groups, wherein R is derived from the branched chain alcohol as described above and is a 2,2-dialkyl-ethyl radical containing in the range of 20 to 36 carbon atoms, wherein each alkyl radical is straight chain, one of said alkyl radicals being at least 8 carbon atoms in length and the other being at least 10 carbon atoms in length. B in the formula is selected from the group of hydrogen atoms, methyl groups and —COOR groups as above. It is to be seen that this formula describes compounds such as acrylic acid esters, methacrylic acid esters, fumaric acid esters, maleic acid esters and the like.

The new compositions of matter of this invention also include copolymers of the materials of the formula above with from about 2.0 to about 4.0 weight percent of a second polymerizable monomer of the formula

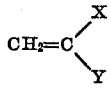

X of this formula represents hydrogen atoms or methyl groups and Y is selected from the class of —OCR' and —COOR' wherein R' is an alkyl group containing from 1 to 18 carbon atoms, aromatic groups, —C≡N groups, and —CONHR'' groups, R'' being an alkyl group of from 3 to 18 carbon atoms. Particularly preferred among the polymerizable monomers included are the vinyl esters of fatty acids containing from 2 to 18 carbon atoms, vinyl acetate being especially preferred.

One especially desirable polymeric material is prepared by copolymerizing from about 40 to 72 weight percent of a di-alkyl fumarate ester as above with from about 5 to about 26 weight percent of a di-alkyl fumarate ester wherein the ester groups contain from 2 to 8 carbon atoms in a straight chain with about 5 to 30 weight percent of vinyl acetate.

The polymeric materials of this invention are compatible with other lubricating oil additive materials known to the art. They may be blended with such additive materials as detergents, other viscosity index improvers or pour point depressants, metal deactivators, rust inhibitors, extreme pressure agents, oiliness agents, and the like.

What is claimed is:

1. An oil soluble polymer of an unsaturated ester of the formula:

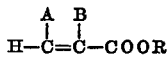

wherein A is selected from the group consisting of a hydrogen atom and —COOR, B is selected from the group consisting of a hydrogen atom and a methyl radical, and R is a 2,2-dialkyl-ethyl radical having in the range of 20 to 36 carbon atoms, wherein each alkyl radical is straight chain, one of said alkyl radicals being at least 8 carbon atoms in length and the other being at least 10 carbon atoms in length, said polymer having the property of reducing the pour point of a phenol extracted Mid-Continent distillate having a viscosity at 210° F. of 45.6 SUS and a viscosity index of 100 by at least 5° F. in 0.05 weight percent concentration therein.

2. The polymer of claim 1 wherein said unsaturated ester is a methacrylate ester.

3. The polymer of claim 1 wherein said unsaturated ester is a fumarate ester.

4. The polymer of claim 1 wherein said unsaturated ester is copolymerized within the range of 2 to 40% of a vinyl fatty acid ester containing in the range of 3 to 8 carbon atoms.

5. The polymer of claim 4 wherein said vinyl fatty acid ester is vinyl acetate.

6. The polymer of claim 1 wherein the range of 49 to 71 weight percent of said unsaturated ester is copolymerized within the range of 11 to 26 weight percent of a fumarate diester of a straight chain alcohol having in the range of 2 to 4 carbon atoms, and in the range of 5 to 30 weight percent of vinyl acetate.

7. An oil soluble polymer of a dialkyl fumarate diester wherein the alkyl groups thereof are each a 2,2-dialkyl-ethyl radical containing in the range of 20 to 36 carbon atoms, wherein each alkyl radical thereof is straight chain, one of said alkyl radicals being at least 8 carbon atoms in length and the other being at least 10 carbon atoms in length, said polymer having the property of reducing the pour point of a phenol extracted Mid-Continent distillate having a viscosity at 210° F. of 45.6 SUS and a viscosity index of 100 by at least 5° F. in 0.05 weight percent concentration therein.

8. The polymer of claim 7 wherein said dialkyl fumarate diester is copolymerized within the range of 2 to 40% of vinyl acetate.

9. An oil soluble polymer of an acrylate ester, the alkyl group being a 2,2-dialkyl-ethyl radical containing in the range of 20 to 36 carbon atoms, wherein each alkyl radical is straight chain, one of said alkyl radicals being at least 8 carbon atoms in length and the other being at least 10 carbon atoms in length, said polymer having the property of reducing the pour point of a phenol extracted Mid-Continent distillate having a viscosity at 210° F. of 45.6 SUS and a viscosity index of 100 by at least 5° F. in 0.05 weight percent concentration therein.

10. The polymer of claim 9 wherein said acrylate ester is a methacrylate ester and said polymer is a homopolymer.

11. An oil soluble polymer of di(2-dodecyl hexadecyl) fumarate and in the range of 2 to 40% of vinyl acetate, said polymer having the property of reducing the pour point of a phenol extracted Mid-Continent distillate having a viscosity at 210° F. of 45.6 SUS and a viscosity index of 100 by at least 45° F. in 0.05 weight percent concentration therein.

References Cited in the file of this patent

UNITED STATES PATENTS

| | | |
|---|---|---|
| 1,945,307 | Dykstra | Jan. 30, 1934 |
| 2,560,588 | Munday et al. | July 17, 1951 |
| 2,600,422 | Neher | June 17, 1952 |
| 2,637,698 | Tutwiler | May 5, 1953 |
| 2,642,414 | Bauer et al. | June 16, 1953 |
| 2,666,746 | Munday et al. | Jan. 19, 1954 |
| 2,678,919 | Tutwiler et al. | May 18, 1954 |
| 2,721,877 | Popkin et al. | Oct. 25, 1955 |
| 2,721,878 | Popkin et al. | Oct. 25, 1955 |

OTHER REFERENCES

"Organic Coating Technology," Payne, vol. I, 1954, John Wiley, N. Y., page 539 pertinent.